US008373896B2

(12) United States Patent

Tsutsumi

(10) Patent No.: US 8,373,896 B2

(45) Date of Patent: Feb. 12, 2013

(54) IMAGE PROCESSING APPARATUS, CONTROL METHOD THEREFOR, PROGRAM, AND STORAGE MEDIUM

(75) Inventor: Shuichi Tsutsumi, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 918 days.

(21) Appl. No.: 12/472,986

(22) Filed: May 27, 2009

(65) Prior Publication Data

US 2009/0296120 A1 Dec. 3, 2009

(30) Foreign Application Priority Data

Jun. 3, 2008 (JP) ................................ 2008-145717

(51) Int. Cl.
*G06F 15/00* (2006.01)

(52) U.S. Cl. .......................................... 358/1.9; 399/53

(58) Field of Classification Search ........................ None
See application file for complete search history.

(56) References Cited

U.S. PATENT DOCUMENTS 5,915,144 A * 6/1999 Ide et al. ...................... 430/45.3
8,086,124 B2 * 12/2011 Zaima ............................ 399/53
8,086,161 B2 * 12/2011 Omata .......................... 399/341
2005/0135851 A1 6/2005 Ng et al.
2007/0097461 A1 5/2007 Ng et al.
2007/0127940 A1 * 6/2007 Zaima ............................ 399/53
2008/0063413 A1 3/2008 Zuber
2009/0268216 A1 * 10/2009 Iinuma .......................... 358/1.4

FOREIGN PATENT DOCUMENTS

EP 1804130 A1 7/2007
JP 2002-318482 A 10/2002

* cited by examiner

*Primary Examiner* — Twyler Haskins
*Assistant Examiner* — Helen Q Zong
(74) *Attorney, Agent, or Firm* — Canon USA Inc. IP Division

(57) ABSTRACT

An image processing apparatus includes an acquiring unit configured to acquire a first amount of a transparent toner for use in 2-pass printing in which a color toner is fixed on a recording medium and then the transparent toner is fixed, a change-amount acquiring unit configured to acquire a first amount of change in lightness between an image after the color toner is fixed to the recording medium and an image after the 2-pass printing is performed on the recording medium using the first amount of the transparent toner, and a setting unit configured to set a second amount of the transparent toner for use in 1-pass printing such that a difference between the first amount of change in lightness and a second amount of change in lightness is equal to or smaller than a threshold, the second amount of change in lightness being an amount of change in lightness between the image after the color toner is fixed to the recording medium and a 1-pass printing image after the color toner and the second amount of the transparent toner are fixed to the recording medium.

3 Claims, 12 Drawing Sheets

FIG. 6

1-PASS ADHESION AMOUNT OF TRANSPARENT TONER

| LIGHTNESS OF TRANSPARENT TONER BACKGROUND IMAGE | 90 | 70 | 50 | 30 |
|---|---|---|---|---|
| 90 | -3.0 | -2.8 | -2.6 | -2.4 |
| 80 | -2.9 | -2.6 | -2.5 | -2.4 |
| 60 | -2.7 | -2.5 | -2.3 | -2.1 |
| 40 | -2.2 | -2.0 | -1.8 | -1.7 |
| 30 | -2.1 | -2.0 | -1.8 | -1.6 |
| 20 | -2.0 | -1.8 | -1.7 | -1.5 |

601

FIG. 7

2-PASS ADHESION AMOUNT OF TRANSPARENT TONER

| LIGHTNESS OF TRANSPARENT TONER BACKGROUND IMAGE | 90 | 70 | 50 | 30 |
|---|---|---|---|---|
| 90 | -3.0 | -2.8 | -2.6 | -2.4 |
| 80 | -2.9 | -2.6 | -2.5 | -2.4 |
| 60 | -2.5 | -2.3 | -2.0 | -1.9 |
| 40 | -2.2 | -2.0 | -1.8 | -1.7 |
| 30 | -2.1 | -2.0 | -1.8 | -1.6 |
| 20 | -2.0 | -1.8 | -1.7 | -1.5 |

701

FIG. 11

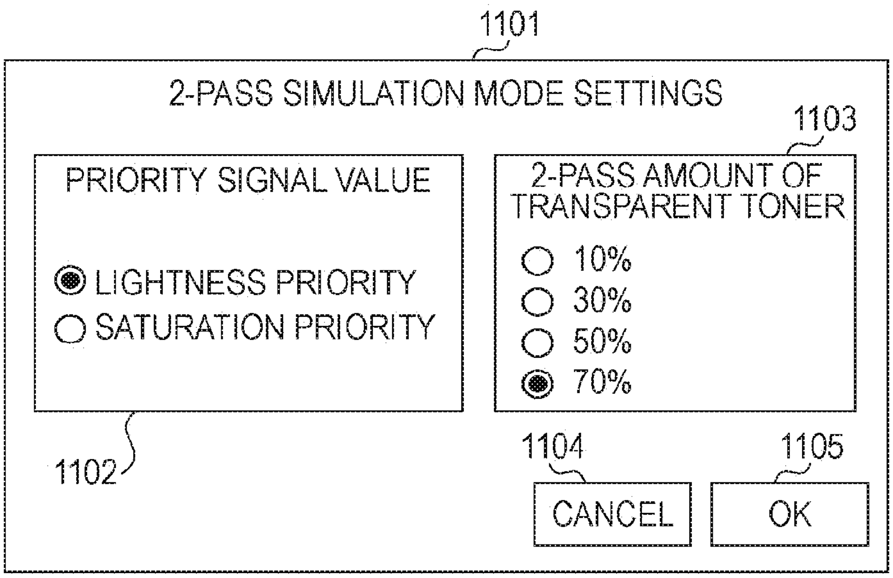

FIG. 12

$$fx = \begin{cases} \sqrt[3]{x_\gamma} & x_\gamma > 0.008856 \\ (903.3 \times x_\gamma + 16)/116 & x_\gamma \leq 0.008856 \end{cases}$$

$$fy = \begin{cases} \sqrt[3]{y_\gamma} & y_\gamma > 0.008856 \\ (903.3 \times y_\gamma + 16)/116 & y_\gamma \leq 0.008856 \end{cases}$$

$$fz = \begin{cases} \sqrt[3]{z_\gamma} & z_\gamma > 0.008856 \\ (903.3 \times z_\gamma + 16)/116 & z_\gamma \leq 0.008856 \end{cases}$$

$$x_\gamma = X/X_\gamma$$

$$y_\gamma = Y/Y_\gamma$$

$$z_\gamma = Z/Z_\gamma$$

$$L = 116 \times fy - 16$$

$$a = 500 \times (fx - fy)$$

$$b = 200 \times (fy - fz)$$

IMAGE PROCESSING APPARATUS, CONTROL METHOD THEREFOR, PROGRAM, AND STORAGE MEDIUM

BACKGROUND OF THE INVENTION

1. Field of the Invention

The present invention relates to an image processing apparatus, a control method therefor, and a storage medium. In particular, the present invention relates to an image processing apparatus for forming a toner image on a recording medium using a combination of a color toner and a transparent toner, a method for controlling the same, and a storage medium.

2. Description of the Related Art

In the field of laser printers and copiers that form an image by electrophotography, attention is focusing on not only traditional electrophotographic full-color printing using a color toner but also multicolor printing using a special toner, in addition to a color toner. The color toners indicate toners corresponding to four colors: cyan (C), magenta (M), yellow (Y), and black (Bk).

Examples of the special toner include a transparent toner that improves glossiness and protection of a toner image and a light toner that can suppress roughness of a highlighted part. The use of the special toner can add new value different from that in normal digital printing, and can further expand the range of digital printing.

Examples of the case where the transparent toner is used can be the case where the transparent toner is applied over the entire surface of an image with the aim of preventing toner separation and improving glossiness and the case where the transparent toner is partly applied as a watermark.

Applying a transparent toner can be classified into two methods: 1-pass and 2-pass (see, for example, Japanese Patent Laid-Open No. 2002-318482).

A 1-pass operation is described below using a multifunction peripheral (MFP) 101 illustrated in FIG. 2.

A photosensitive drum 217 is first charged and then exposed using a laser beam from a semiconductor laser 213. Color toners M, C, Y, and Bk and a transparent toner CL are attached to the photosensitive drum 217 sequentially using developing units 219 to 223. After the completion of attaching all of the toners to the photosensitive drum 217, the toners are transferred from the photosensitive drum 217 to a transfer drum 224. The transfer drum 224 is brought into intimate contact with a sheet of paper, electric charges are provided from the back of the sheet, and the toners are transferred to the sheet. At the last step, heat and pressure are applied to the sheet to which the toners adhere, and the toners are fixed to the sheet. The fixing condition for this case is the one in which the transparent toner and color toners are fixed at the same time.

A 2-pass operation is described next below using the same FIG. 2. The photosensitive drum 217 is first charged and then exposed using a laser beam from the semiconductor laser 213. The color toners M, C, Y, and Bk are attached to the photosensitive drum 217 sequentially using the developing units 219 to 222. After the completion of attaching all of the C, M, Y, and Bk color toners to the photosensitive drum 217, the toners are transferred from the photosensitive drum 217 to the transfer drum 224. The transfer drum 224 is brought into intimate contact with a sheet of paper, and electric charges are provided from the back of the sheet, and the toners are transferred to the sheet. Then, heat and pressure are applied to the sheet to which the toners adhere, and the toners are fixed to the sheet. This type of printing, which uses only a color toner, is called pre-printing.

The printed output (pre-printed sheet) with the C, M, Y, and Bk color toners being fixed is set on a paper feed tray 225 again. The photosensitive drum 217 is charged again and then exposed using a laser beam from the semiconductor laser 213. The transparent toner (CL) is attached to the photosensitive drum 217 using the transparent toner developing unit 223. After the completion of attaching the transparent toner to the photosensitive drum 217, the toner is transferred from the photosensitive drum 217 to the transfer drum 224. The transfer drum 224 is brought into intimate contact with a sheet of paper, electric charges are provided from the back of the sheet, and the toner is transferred to the sheet. At the last step, heat and pressure are applied to the sheet to which the toner adheres, and the toner is fixed to the sheet. The fixing condition for this case is the one in which the transparent toner and color toners are fixed in separate processes.

In the foregoing description, the same MFP 101 performs pre-printing and printing using the transparent toner (hereinafter referred to also as transparent-toner printing). However, different MFPs may carry out the 2-pass process. For example, an MFP 103 performs pre-printing, whereas the MFP 101 performs transparent-toner printing.

Concepts of 1-pass and 2-pass processes are illustrated in FIGS. 17A, 17B, and 17C. FIG. 17A illustrates a concept of the 1-pass process. FIG. 17B illustrates a concept of the 2-pass process using different MFPs (1701, 1702). FIG. 17C illustrates a concept of the 2-pass process using the same MFP.

The 2-pass process requires work of manually setting a pre-printed sheet on the paper feed tray of an MFP, but this process is advantageous in that the use of two image processing apparatuses capable of high-speed printing allows a printed output on which the transparent toner is applied to be obtained at high speed. In contrast, the 1-pass process enables a printed output on which the transparent toner is applied to be readily obtained because the 1-pass process does not require setting a sheet on the paper feed tray.

In the case of the 1-pass process, if the total amount of color toners applied to a sheet is large, the amount of a transparent toner adherable is limited. In contrast, in the case of the 2-pass process, the transparent toner can adhere to a sheet irrespectively of the total amount of color toners applied to the sheet, so desired glossiness is always achievable.

In consideration of these characteristics, one possible case is the one in which in a printing site that requires frequent proofreading the simple 1-pass process is used in the proofreading as a trial print run and in actual printing the 2-pass process capable of achieving high glossiness is used.

However, a problem arises in which there is a difference in values such as lightness, saturation, or hue for a printed output depending on the difference between toner characteristics or fixing conditions. For example, there is a difference between a signal value of a printed output on which a transparent toner is applied through the 1-pass process and that of a printed output on which a transparent toner is applied through the 2-pass process even if the same amount of the same transparent toner is applied to an image prior to fixation of the transparent toner. This is because the 1-pass process and 2-pass process have different numbers of fixing and pressures used in fixing.

SUMMARY OF THE INVENTION

The present invention provides a technique for reducing the difference between values in printed output between a 1-pass process and a 2-pass process resulting from the difference between toner characteristics or fixing conditions.

According to an aspect of the present invention, an image processing apparatus includes an acquiring unit, a change-amount acquiring unit, and a setting unit. The acquiring unit is configured to acquire a first amount of a transparent toner for use in 2-pass printing in which a color toner is fixed on a recording medium and then the transparent toner is fixed. The change-amount acquiring unit is configured to acquire a first amount of change in lightness between an image after the color toner is fixed to the recording medium and an image after the 2-pass printing is performed on the recording medium using the first amount of the transparent toner. The setting unit is configured to set a second amount of the transparent toner for use in 1-pass printing such that a difference between the first amount of change in lightness and a second amount of change in lightness is equal to or smaller than a threshold, the second amount of change in lightness being an amount of change in lightness between the image after the color toner is fixed to the recording medium and a 1-pass printing image after the color toner and the second amount of the transparent toner are fixed to the recording medium.

According to an aspect of the present invention, an image processing apparatus includes a change-amount acquiring unit, a determining unit, and a setting unit. The change-amount acquiring unit is configured to acquire an amount of change in lightness between an image after a color toner is fixed to a recording medium and an image after the color toner and a third amount of a transparent toner are fixed to the recording medium. The determining unit is configured to determine whether the amount of change in lightness acquired by the change-amount acquiring unit is equal to or larger than a predetermined threshold. The setting unit is configured to set an amount of the transparent toner to be fixed to the recording medium at substantially zero when the determining unit determines that the amount of change in lightness is equal to or larger than the predetermined threshold and to set the amount of the transparent toner to be fixed to the recording medium at the third amount of the transparent toner when the determining unit determines that the amount of change in lightness is smaller than the predetermined threshold.

According to an aspect of the present invention, an image processing apparatus includes an acquiring unit, a change-amount acquiring unit, and a setting unit. The acquiring unit is configured to acquire a first amount of a transparent toner for use in 2-pass printing in which a color toner is fixed on a recording medium and then the transparent toner is fixed. The change-amount acquiring unit is configured to acquire a first amount of change in lightness between an image after the color toner is fixed to the recording medium and an image after the 2-pass printing is performed on the recording medium using the first amount of the transparent toner. The setting unit is configured to set a second amount of the transparent toner for use in 1-pass printing such that a difference between the first amount of change in lightness and a second amount of change in lightness is a minimum, the second amount of change in lightness being an amount of change in lightness between the image after the color toner is fixed to the recording medium and a 1-pass printing image after the color toner and the second amount of the transparent toner are fixed to the recording medium.

With the present invention, the difference between signal values resulting from the difference between toner characteristics or fixing conditions can be suppressed.

Further features of the present invention will become apparent from the following description of exemplary embodiments with reference to the attached drawings.

BRIEF DESCRIPTION OF THE DRAWINGS

FIG. 6 illustrates an example of a 1-pass lightness characteristics look-up table (LUT).

FIG. 7 illustrates an example of a 2-pass lightness characteristics LUT.

FIG. 11 illustrates an example of a screen appearing on a personal computer (PC) or a display device of the MFP.

FIG. 12 illustrates expressions for converting XYZ into Lab (CIE 1976 L*a*b*).

DESCRIPTION OF THE EMBODIMENTS

Embodiments of the present invention are described below with reference to the accompanying drawings.

First Embodiment

In a first embodiment, an image processing apparatus is provided that performs printing using a 1-pass process (1-pass printing) in such a way that the lightness and saturation of an output printed image is similar to that that would have been obtained using a 2-pass process (hereinafter, this printing is referred to as 2-pass simulation).

Figure 1:
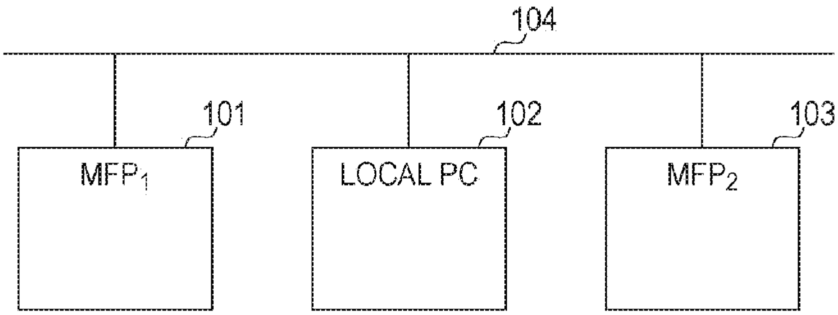
FIG. 1 is a block diagram that illustrates an image processing system according to an embodiment of the present invention.

FIG. 1 is a block diagram of an image processing system that includes a multifunctional peripheral (MFP) being an image processing apparatus according to one example of the present invention.

A MFP 101 for performing 1-pass printing (collectively performing printing using a transparent toner and printing using color toners) as the present embodiment is connected to a local area network (LAN) 104. The LAN 104 is connected to another MFP 103 and a PC 102. The MFP 101 performs image processing on an input image read from an original and prints the result. After the MFP 103 reads an original and performs image processing, the MFP 101 can also print the result. Further, the MFP 101 can also produce a printed output after interpreting page description language (PDL) data transmitted from the PC 102.

The MFP 103 is necessary to perform printing using a 2-pass process (separately perform printing using a transparent toner and printing using color toners). In the present embodiment, the internal structure of the MFP 103 is substantially the same as in the MFP 101, so the description is provided below using the same reference numerals. Alternatively, the MFP 103 can have a different internal structure. For example, the MFP 103 can have a structure that can apply only a transparent toner.

Figure 2:
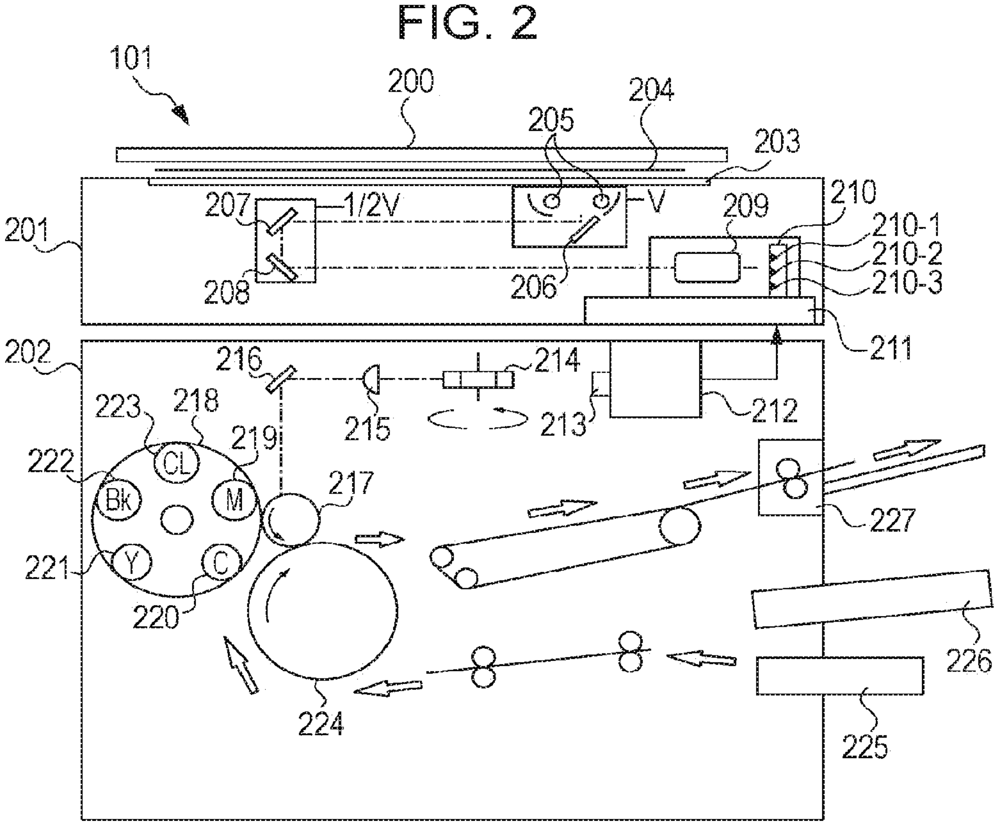
FIG. 2 illustrates a configuration of a multifunction peripheral (MFP).
Figure 3:
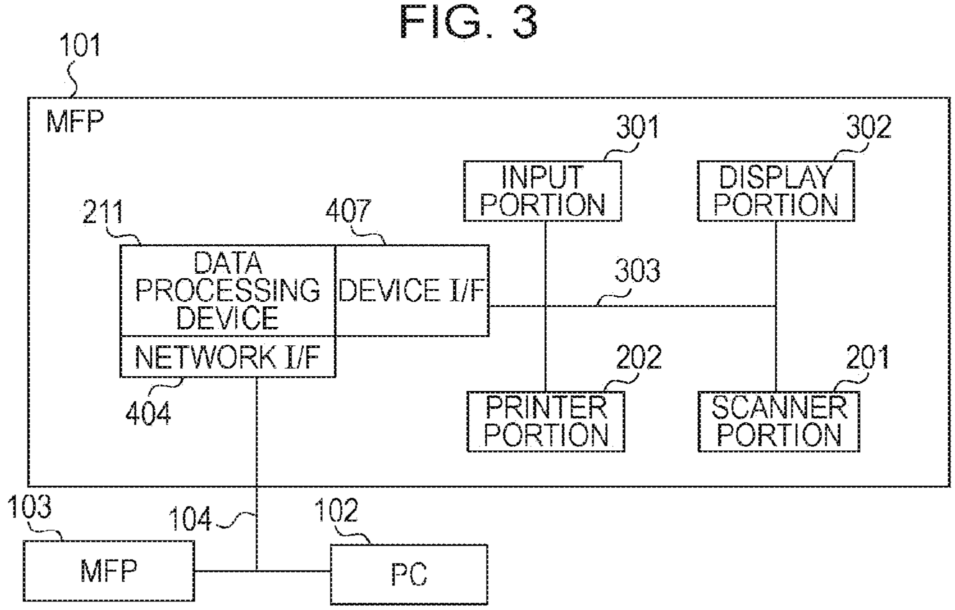
FIG. 3 is a block diagram of a system of the MFP.
Figure 4:
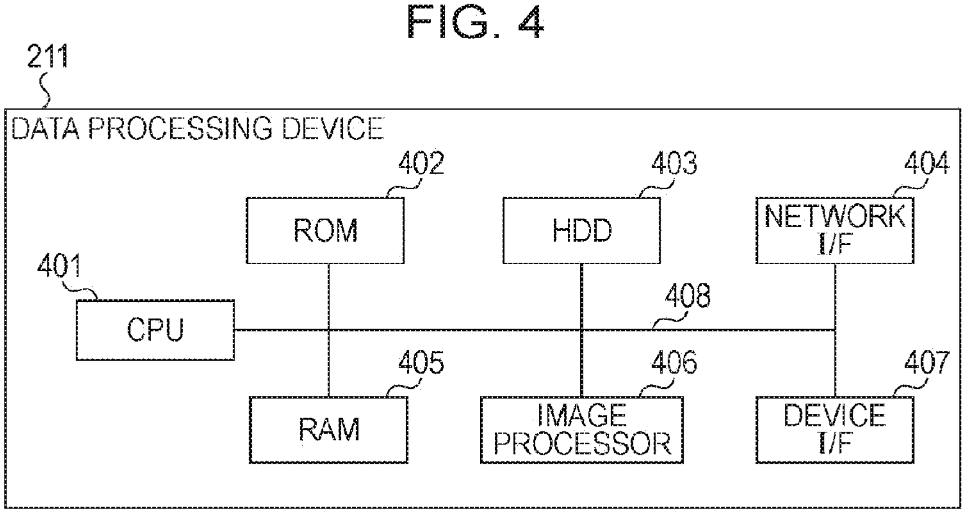
FIG. 4 is a block diagram that illustrates an internal structure of a data processing device.

FIGS. 2 and 3 illustrate a hardware configuration of the MFP 101 for 1-pass printing. FIG. 4 illustrates a detailed internal structure of a data processing device 211.

In FIG. 2, a scanner portion 201 reads an original and performs digital signal processing.

A printer portion 202 prints a full-color image corresponding to an image of an original read by the scanner portion 201 on a sheet.

In the scanner portion 201, an original 204 between a mirror-finished pressure plate 200 and an original plate glass (hereinafter referred to as platen) 203 is illuminated by a lamp 205. The reflected light is guided by mirrors 206, 207, and 208, and an image is formed on a three-line solid-state image sensing element (hereinafter referred to as CCD) 210 through a lens 209. Finally, three image signals of red (R), green (G), and blue (B) as full-color information are transmitted to the data processing device 211. The entire surface of the original is scanned in a sub scanning direction by mechanical movement of the lamp 205 and the mirror 206 at a speed of v and that of the mirrors 207 and 208 at a speed of ½ v in a direction substantially perpendicular to an electrical scanning direction of the line sensor (main scanning).

In such a way, the original 204 is read with a resolution of 600 dpi (dots per inch) in both main scanning and sub scanning. Image signals obtained by reading are stored in a hard disk drive (HDD) 403 or a random-access memory (RAM) 405 disposed in the data processing device 211 in units of one page of an original.

A central processing unit (CPU) 401 and an image processor 406 in the data processing device 211 electrically process the image signals stored in the HDD 403 or the RAM 405 in units of a pixel and divide them into M, C, Y, and Bk components. Each component is transmitted to the printer portion 202 through a device interface (I/F) 407. The data processing device 211 creates transparent (CL) image data therein in units of a pixel and transmits it to the same printer portion 202.

The printer portion 202 performs printing on a recording medium, such a sheet of paper. The details are described below.

Each of the M, C, Y, Bk, and CL image signals is transmitted from the data processing device 211 to a laser driver 212 in the printer portion 202. In response to the transmitted image signal, the laser driver 212 drives a semiconductor laser 213 so as to modulate a laser beam. The laser beam is emitted through a polygonal mirror 214, an f-θ lens 215, and a mirror 216 and is used to scan the photosensitive drum 217. Writing is carried out with a resolution of 600 dpi in both main scanning and sub scanning, similar to reading.

A rotary developing device 218 includes a magenta developing section 219, a cyan developing section 220, a yellow developing section 221, a black developing section 222, and a transparent (CL) developing section 223. These five developing sections alternately come near the photosensitive drum 217, thus developing an electrostatic latent image formed on the photosensitive drum 217 with colors.

A transfer drum 224 wraps a sheet supplied from a paper feed tray 225 or 226 and transfers an image developed on the photosensitive drum 217 to the sheet.

After the images of the five M, C, Y, Bk, and CL toners are sequentially transferred, the sheet passes through a fixing unit 227, the toners are fixed, and the sheet is ejected.

FIG. 3 is a block diagram that illustrates an internal structure of the MFP 101 for performing 1-pass printing.

The MFP 101 includes an input portion 301 and is operated therethrough. Examples of the input portion 301 include a touch panel, a keyboard, and a mouse (not shown).

The MFP 101 includes a display portion 302 and can display a status of an operation input and image data to be processed on the display portion 302. Examples of the display portion 302 include a touch panel and a display (not shown).

The input portion 301, the display portion 302, and the data processing device 211 are connected to a bus 303 and can exchange data thereamong.

FIG. 4 is a block diagram that illustrates an internal system of the data processing device 211.

The user can operate the input portion 301 while viewing the display portion 302. In response to an operation through the input portion 301, the CPU 401 carries out predetermined control. The CPU 401 is connected to the HDD 403, the RAM 405, the device I/F 407, the image processor 406, a read-only memory (ROM) 402, and a network I/F 404 through a bus 408.

At least one of the ROM 402 and the HDD 403 stores at least data such as information for touch panel display and a program for use in the present embodiment. This data can be stored in either one of the ROM 402 and the HDD 403. In the present embodiment, the description is provided, assuming that all of this data is stored in the HDD 403.

The network I/F 404 is an interface for use in communication with the PC 102 and the MFP 103 through the LAN 104 performed by the data processing device 211.

The RAM 405 stores at least temporary data necessary for processing to be performed by the CPU 401. This data can also be stored in the HDD 403. In the present embodiment, the description is provided, assuming that all of this data is stored in the RAM 405.

The image processor 406 indicates a group of hardware, such as an application-specific integrated circuit (ASIC) for performing image processing. The image processor 406 is used when processing performed by the CPU 401, which will be described below, is executed by hardware. In this case, the processing performed by the CPU 401 and that by the image processor 406 can be freely divided.

The device I/F 407 is an interface for use in communication with another device, such as the input portion 301 in the MFP 101.

The MFP 101 stores a 1-pass lightness characteristics Look-up table (LUT), a 2-pass lightness characteristics LUT, a 1-pass saturation characteristics LUT, and a 2-pass saturation characteristics LUT. The structure of these tables will now be described followed by a method for generating the tables.

The 1-pass lightness characteristics LUT is described below. That is, the 1-pass lightness characteristics LUT is a table obtained by reading lightness of color-coded images (patch images illustrated in FIG. 5) in which N different amounts of transparent toner are applied by 1-pass printing onto M different lightness color-coded patch images. This table (illustrated in FIG. 6) indicates the amount of change in lightness of each of the M lightness color-coded patch images caused by application of each of the N different amounts of transparent toner. The table has axes of lightness (M entries, in this case 20, 30, 40, 60, 80, and 90) and amounts of transparent toner (N entries, in this case 90, 70, 50, and 30).

The 1-pass saturation characteristics LUT is described below. That is, the 1-pass saturation characteristics LUT is a table obtained by reading saturation of color-coded images (patch images illustrated in FIG. 5) in which N different amounts of transparent toner are applied by 1-pass printing on M lightness color-coded patch images. This table indicates the amount of change in saturation of each of the lightness color-coded patch images caused by application of the N different amounts of transparent toner and has axes lightness (M entries, in this case 20, 30, 40, 60, 80, and 90) and amounts of transparent toner (N entries, in this case 90, 70, 50, and 30).

The 2-pass lightness characteristics LUT is described below. That is, the 2-pass lightness characteristics LUT is a table obtained by reading lightness of color-coded images (patch images illustrated in FIG. 5) in which N different amounts of transparent toner are applied by 2-pass printing on M lightness color-coded patch images. This table (illustrated in FIG. 7) indicates the amount of change in lightness of each of the lightness color-coded patch images caused by application of each of the N different amounts of transparent toner and has axes of lightness (M entries, in this case 20, 30, 40, 60, 80, and 90) and amounts of transparent toner (N entries, in this case 90, 70, 50, and 30).

The 2-pass saturation characteristics LUT is described below. That is, the 2-pass saturation characteristics LUT is a table obtained by reading saturation of color-coded images (patch images illustrated in FIG. 5) in which N different amounts of transparent toner are applied by 2-pass printing on M lightness color-coded patch images. This table indicates the amount of change in saturation of each of the lightness color-coded patch images caused by application of each of the N different amounts of transparent toner. The table has axes of lightness (M entries, in this case 20, 30, 40, 60, 80, and 90) and amounts of transparent toner (N entries, in this case 90, 70, 50, and 30).

The method for generating the 1-pass lightness characteristics LUT and the 1-pass saturation characteristics LUT is described in detail below.

First, data for the color-coded patches is prepared. A patch image in which N different amounts of the transparent toner and extra patches having no transparent toner are applied to each of the M different patches having different lightness values (hereinafter referred to as 1-pass clear patch image) is printed using the MFP 101 by performing 1-pass printing. The lightness can be L of the CIE 1976 L*, a*, b* color space (hereinafter referred to as Lab). In other embodiments Y of YCC, V of HSV, or alternatively, I of HSI could be used.

Figure 5:
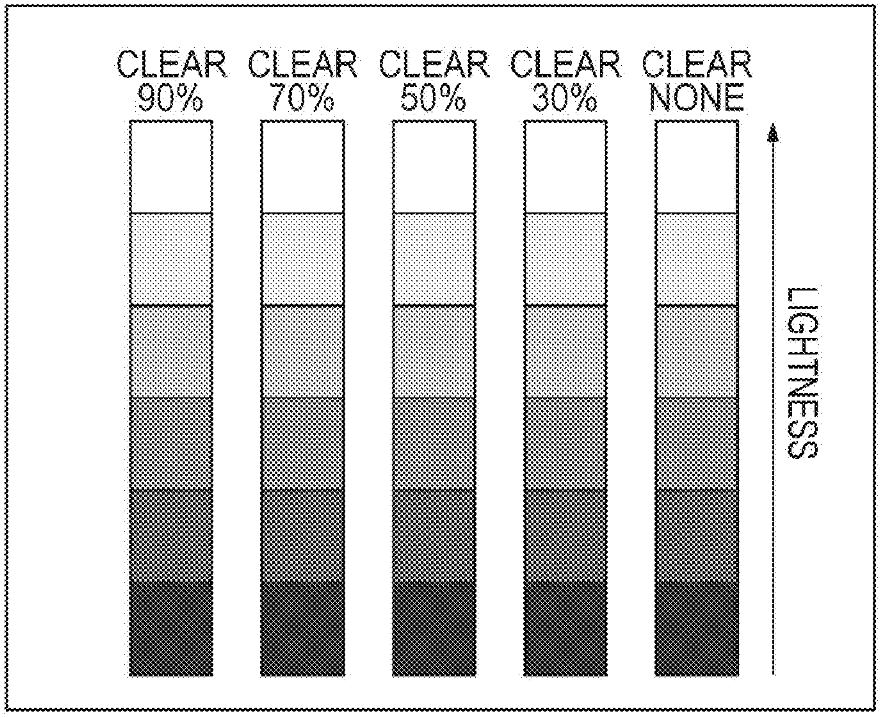
FIG. 5 illustrates an example of a patch image.

FIG. 5 illustrates an example of the 1-pass clear patch image. "Clear" used in FIG. 5 indicates the transparent toner. The 1-pass clear patch image can be an output in which data stored in the ROM 402 is printed or can also be an output in which data transmitted from the PC 102 through the driver and stored in the HDD 403 is printed. Alternatively, the 1-pass clear patch image can also be an output in which data transmitted from the PC 102 through the driver is directly printed.

Then, the Lab value of each patch of a printed output of the 1-pass clear patch image is read using a calorimeter having the Lab metering function or the scanner portion 201 of the MFP 101. The lightness and saturation of each patch are derived from the obtained Lab value.

In the following description, the derived lightness is represented by L1 (L, CL) and the derived saturation is represented by S1 (L, CL) where the lightness of a source image (an image having a 0% amount of transparent toner) is L and the amount of the transparent toner used in the 1-pass process (hereinafter referred to as 1-pass clear amount) is CL.

Using L1 (L, CL) and S1 (L, CL), the difference value dL1 (L, CL) between the lightness of an image in which the transparent toner is applied using the 1-pass process and that of an image in which no transparent toner is applied and the difference value dS1 (L, CL) between the saturation of an image in which the transparent toner is applied using the 1-pass process and that of an image in which no transparent toner is applied are calculated by the following expressions:

$$dL1(L,CL)=L1(L,CL)-L1(L,0)$$

$$dS1(L,CL)=S1(L,CL)-S1(L,0)$$

where CL=0 indicates that no transparent toner is applied. The obtained dL1 (L, CL) is an element of the 1-pass lightness characteristics LUT, and the obtained dS1 (L, CL) is an element of the 1-pass saturation characteristics LUT.

FIG. 6 illustrates an example of the 1-pass lightness characteristics LUT. Each of the numerical values in the table represents dL1. "Lightness of transparent toner background image" used in FIG. 6 indicates the lightness of an image under the transparent toner."

The method for generating the 2-pass lightness characteristics LUT and the 2-pass saturation characteristics LUT is described in detail below.

Firstly, data for the lightness color-coded patches is prepared. A patch image in which the N different amounts of transparent toner and extra patches having no transparent toner are applied to each of the M different patches having different lightness values (hereinafter referred to as 2-pass clear patch image) is printed using the MFP 103 by performing 2-pass printing. An example of the 2-pass clear patch image is illustrated in FIG. 5, as in the case of the 1-pass clear patch image.

The 2-pass clear patch image can be an output in which data stored in the ROM 402 is printed or can also be an output in which data transmitted from the PC 102 through the driver and stored in the HDD 403 is printed. Alternatively, the 2-pass clear patch image can also be an output in which data transmitted from the PC 102 through the driver is directly printed.

Then, the Lab value of each patch of a printed output of the 2-pass clear patch image is read using a calorimeter having the Lab metering function or the scanner portion 201 illustrated in FIG. 2. The lightness L2 (L, CL) and the saturation S2 (L, CL) of each patch is derived from the obtained Lab value.

Using L2 (L, CL) and S2 (L, CL), the difference value dL2 (L, CL) between the lightness of an image in which transparent toner is applied using the 2-pass process and that of an image in which no transparent toner is applied in the 1-pass process and the difference value dS2 (L, CL) between the saturation of an image in which transparent toner is applied using the 2-pass process and that of an image in which no transparent toner is applied in the 1-pass process are calculated by the following expressions:

$$dL2(L,CL)=L2(L,CL)-L1(L,0)$$

$$dS2(L,CL)=S2(L,CL)-S1(L,0)$$

The obtained dL2 (L, CL) is an element of the 2-pass lightness characteristics LUT, and the obtained dS2 (L, CL) is an element of the 2-pass saturation characteristics LUT.

FIG. 7 illustrates an example of the 2-pass lightness characteristics LUT. Each of the numerical values in the table represents dL2. "Lightness of transparent toner background image" used in FIG. 7 indicates the lightness of an image under the transparent toner."

The MFP 101 for performing 1-pass printing runs 2-pass simulation using the characteristics LUTs generated in the above-described way. The 2-pass simulation indicates 1-pass printing performed with the aim of reducing a change in lightness and saturation of a print material on which a transparent toner is to be applied, compared with the result that would be achieved using the 2-pass process.

Figure 8:
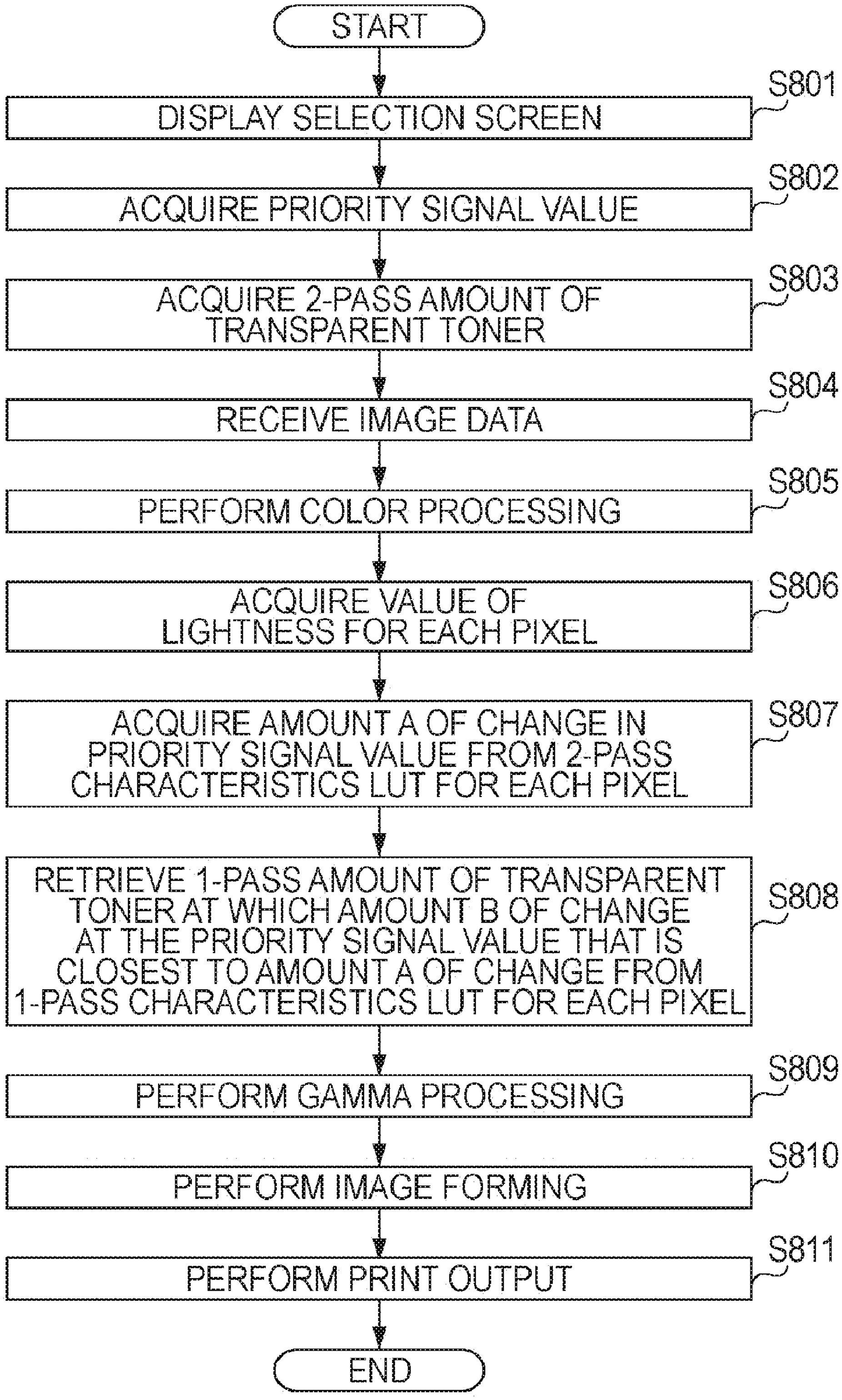
FIG. 8 is a flowchart of a process of image processing according to the embodiment of the present invention.
Figure 9:
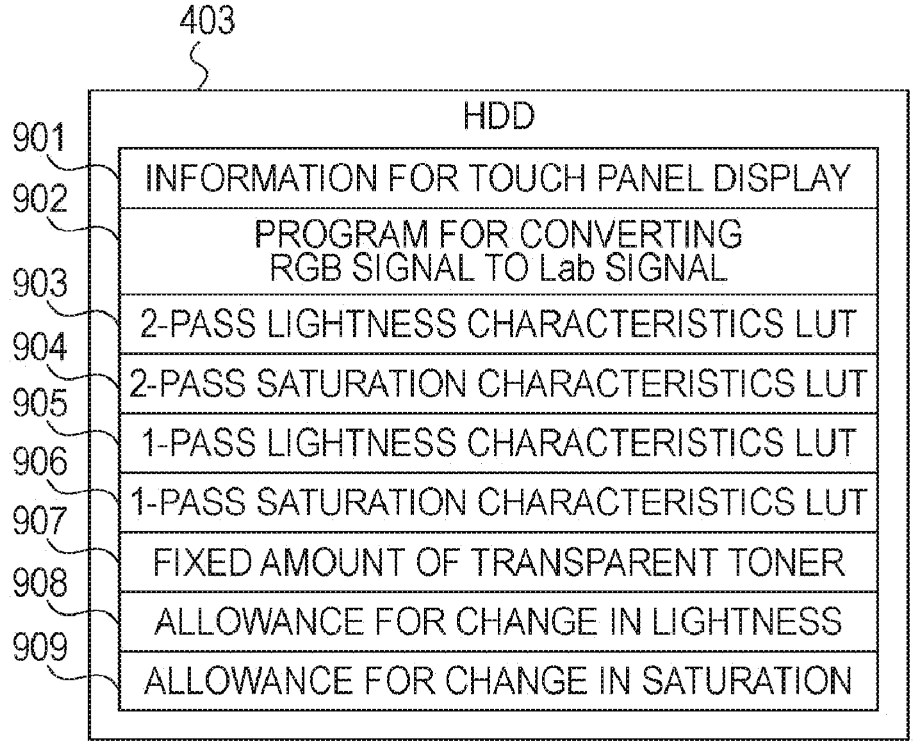
FIG. 9 illustrates an example of a memory map of a hard disk drive (HDD).
Figure 10:
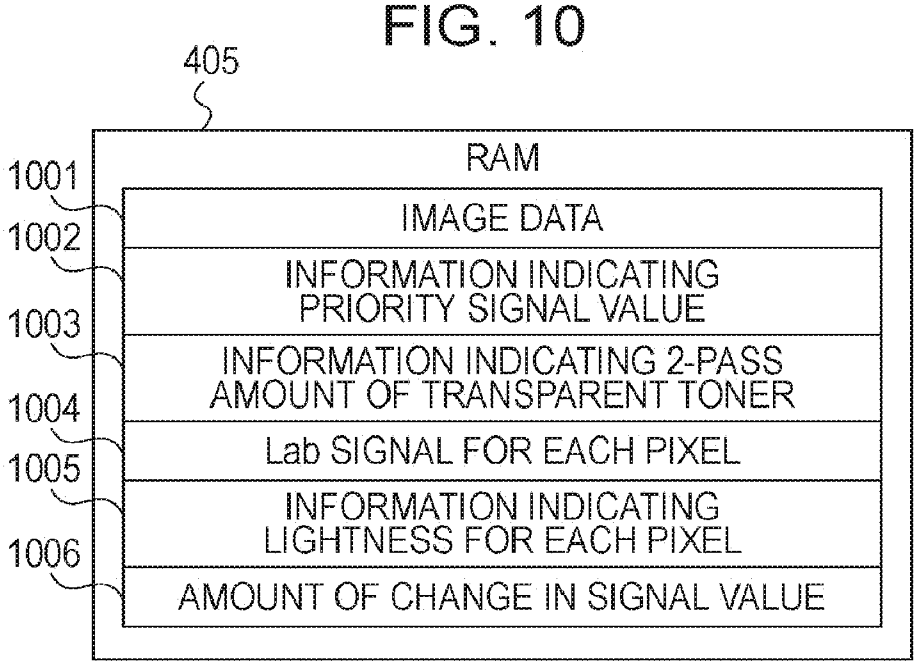
FIG. 10 illustrates an example of a memory map of a random-access memory (RAM).

The steps of the flowchart illustrated in FIG. 8 described below can be implemented in the form of, for example, computer-readable program code in an application program area in the ROM 402, the HDD 403, or the RAM 405. The 2-pass simulation according to the present embodiment is run by the CPU 401 executing the program code. FIG. 9 illustrates an example of a memory map of the HDD 403. FIG. 10 illustrates an example of a memory map of the RAM 405.

In step S801, a selection screen is displayed on the display portion 302 using information 901 for touch panel display stored in the HDD 403. An example of the selection screen is illustrated in FIG. 11. In FIG. 11, a display screen 1101 includes a section 1102 for allowing the user to select a priority signal value and a section 1103 for allowing the user to select the amount of the transparent toner for use in 2-pass printing. When a Cancel button 1104 is pressed, the selection is cancelled. When an OK button 1105 is pressed, the selection is confirmed. In steps S802 and S803, an instruction is input on the display screen 1101.

In step S802, the priority signal value is selected by the user using the input portion 301, and the selection is stored in the RAM 405 as information 1002 indicating the priority signal value. In the present embodiment, the lightness is selected as the priority signal value.

In step S803, the amount of the transparent toner for use in 2-pass printing (hereinafter referred to as 2-pass amount of transparent toner) is selected by the user using the input portion 301, and the selection is stored in the RAM 405 as information 1003 indicating the 2-pass amount of the transparent toner). In the present embodiment, 70% is selected as the 2-pass amount of transparent toner (first amount of transparent toner). This means the user's intention is to apply the transparent toner onto the color toners at a dot area coverage of 70% in 2-pass printing.

In step S804, image data 1001 is received from the PC 102 or the MFP 103 through the network I/F 404. The image data 1001 can also be received from the scanner portion 201 of the MFP 101 through the device I/F 407. The received image data 1001 is stored in the RAM 405.

In step S805, the R, G, and B signals of the received image data 1001 for each pixel are converted into L, a, and b signals. The L, a, and b signals for each pixel are stored in the RAM 405 as a Lab signal 1004 for each pixel.

The conversion uses a program 902 stored in the HDD 403 for converting RGB signals into Lab signals. More specifically, the R, G, and B signals are first converted into X, Y, and Z signals using the following expressions:

$$X=0.412453*R+0.35758*G+0.180423*B$$

$$Y=0.212671*R+0.71516*G+0.072169*B$$

$$Z=0.019334*R+0.119193*G+0.950227*B$$

Then, the X, Y, and Z signals are converted into L, a, and b signals using the conversion expressions illustrated in FIG. 12. Xγ, Yγ, and Zγ indicate tristimulus values of a perfectly diffuse reflector under the same illumination as that for an object color being a target.

The conversion process may be implemented as a matrix operation from R, G, and B signals into L, a, and b signals.

In step S806, the lightness is acquired for each pixel in the image data 1001. That is, the lightness 1005 for each pixel in the image data 1001 is acquired from the L, a, and b signals and is stored in the RAM 405. The lightness is acquired by acquisition of the value of L of the L, a, and b signals.

The lightness and saturation are acquired from the L, a, and b signals. Alternatively, the lightness may also be acquired from YCbCr or HSV space.

For the sake of clarity, a certain pixel in the image data 1001 is discussed. The lightness of this pixel is assumed as 60.

In step S807, from a 2-pass lightness characteristics LUT 903 or 2-pass saturation characteristics LUT 904 stored in the HDD 403, with respect to that signal value, the amount of change in the signal value when the transparent toner is applied with a dot area coverage of the 2-pass amount of the transparent toner is acquired (change amount acquisition). The amount 1006 of change in signal value is stored in the RAM 405. The 2-pass lightness characteristics LUT 903 or 2-pass saturation characteristics LUT 904 is used depending on the priority signal value.

For example, when the transparent toner is applied to a pixel having a lightness of 60 using the 2-pass process with a dot area coverage of 70%, by referring to an element 701 of the 2-pass lightness characteristics LUT 903 illustrated in FIG. 7, the amount of change in lightness is determined as −2.3.

In step S808, the 1-pass lightness characteristics LUT is referred to. The lightness of the pixel under consideration is 60. The lightness of 60 corresponds to a row 601 in the 1-pass lightness characteristics LUT 905 illustrated in FIG. 6. This row of the 1-pass characteristics LUT is retrieved.

The value in the retrieved row of the 1-pass characteristics LUT that is closest to the selected value 701 in the 2-pass lightness characteristics LUT is determined. This is done by calculating absolute differences between values in the row 601 and the value 701. In this case the closest value corresponds to a 1-pass adhesion amount of transparent toner of 50, which has the same value (−2.3) as the selected value (−2.3). The closest value should have an absolute difference that is less than a preset threshold value. If no value in the row of the 1-pass lightness characteristics LUT having a difference below the threshold exists, the 2-pass simulation is stopped. The predetermined threshold when the priority signal value is the lightness is in the range of approximately +0.1 to −0.1.

If there are a plurality of 1-pass clear amounts at which the absolute value of the difference is a minimum, a smaller 1-pass clear amount may be selected, or a 1-pass clear amount that is close to the 1-pass clear amount to be applied to the peripheral pixels may be selected.

For example, if the amount of change in lightness when the transparent toner is applied using the 2-pass process is −2.3 and the row 601 illustrated in FIG. 6 is retrieved, FIG. 6 shows that the 1-pass clear amount is determined as 50%.

When the amounts of C, M, Y, Bk toners and CL (transparent) toner are determined through the above-described steps, gamma processing is performed on each color in step S809.

In step S810, image processing is performed on each color. Examples of the image processing include screen processing and error diffusion.

In the last step S811, data is transmitted to the printer portion 202.

In the foregoing description, the lightness is used as the signal value. If the saturation is used as the signal value, a similar process is achievable using the 2-pass saturation characteristics LUT and 1-pass saturation characteristics LUT.

In the foregoing description, processing is performed using the CPU 401. The processing may be implemented in part or in entirety using hardware, such as an ASIC contained in the image processor 406.

The characteristics LUTs stored in the HDD 403 may be stored in part or in entirety in the ROM 402.

The amounts of change in signal value stored in the RAM 405 may be stored in part or in entirety in the HDD 403.

In the present embodiment, values in the table are directly used. Alternatively, a finer value can be used in control by, for example, complementing of an intermediate value using first order approximation.

With the present embodiment, the difference between signal values resulting from the difference between a fixing condition for the transparent toner and that in the color toners can be suppressed. Accordingly, the similar lightness and saturation of a print material to that obtained when the transparent toner is applied using the 2-pass process can be readily reproduced through the 1-pass transparent toner printing.

Second Embodiment

In the first embodiment, the 2-pass amount of the transparent toner is selected by the user.

The 2-pass amount of the transparent toner may also be determined for each pixel through control performed in accordance with the color toner.

In a second embodiment, the 2-pass amount of the transparent toner is determined for each pixel such that the total of the 2-pass amount of the transparent toner and the amounts of the color toners is constant.

Figure 13:
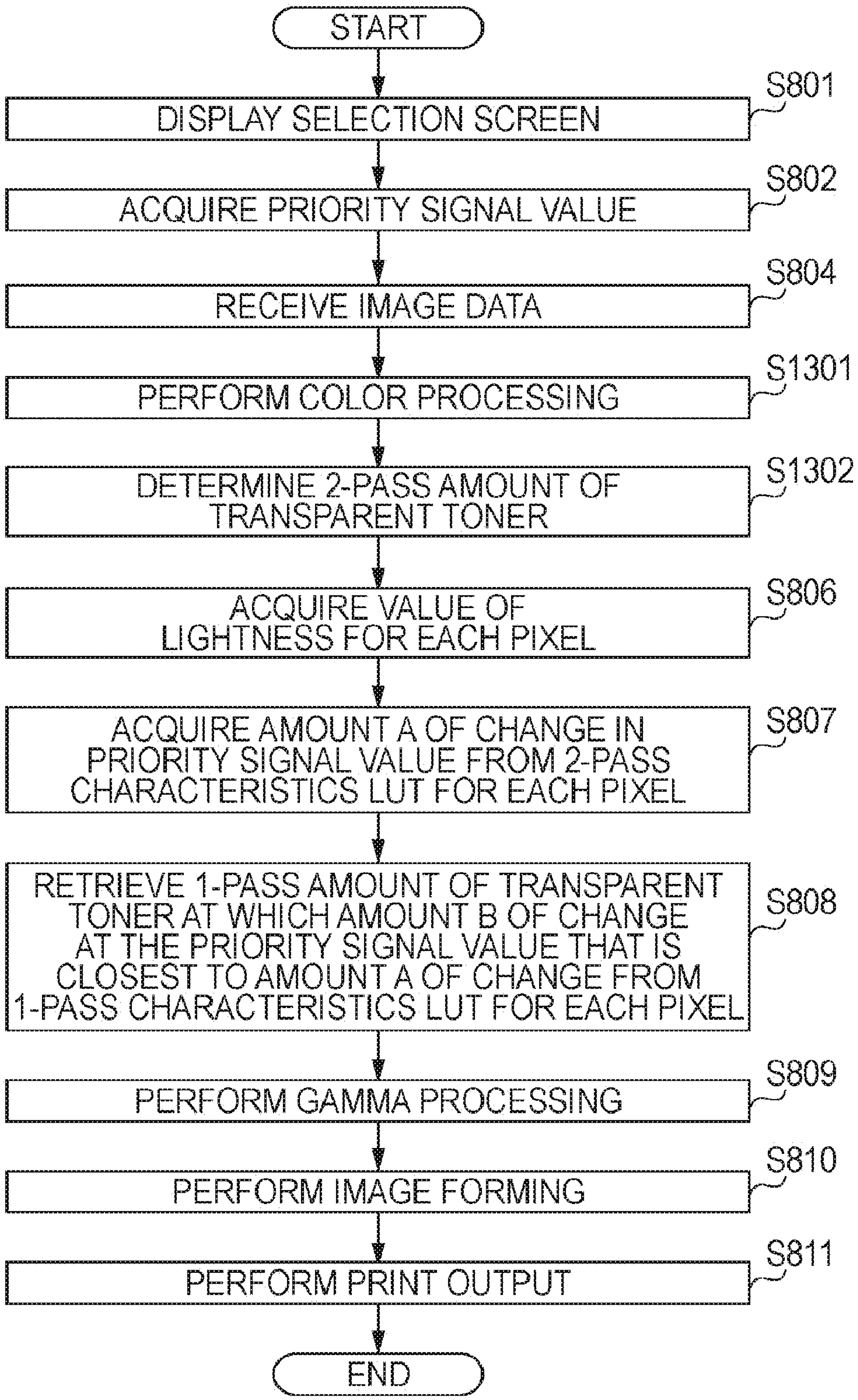
FIG. 13 is a flowchart that illustrates a process of image processing according to another embodiment of the present invention.

The steps of the flowchart illustrated in FIG. 13 described below can be implemented in the form of, for example, computer-readable program code in an application program area in the ROM 402, the HDD 403, or the RAM 405. The 2-pass simulation according to the present embodiment carried out by the MFP 101 for performing 1-pass printing is run by the CPU 401 executing the program code.

In the image processing apparatus according to the present embodiment, the same reference numerals are used in similar elements to those in the first embodiment described above, and the detailed description thereof is not repeated here. A configuration different from that in the first embodiment is described below.

In step S1301, the R, G, and B signals in the received image data 1001 for each pixel are converted into L, a, and b signals, similar to step S805. In addition, the amount of the C, M, Y, and Bk toners is also calculated using, for example, a matrix operation.

In step S1302, the 2-pass amount of the transparent toner for each pixel in the image data 1001 is determined responsive to the amount of each of the C, M, Y, and Bk toners calculated in step S1301. At this time, the total of the 2-pass amount of the transparent toner and the amount of the color toners is constant.

With the present embodiment, the difference between signal values resulting from the difference between a fixing condition for the transparent toner and that in the color toners can be suppressed. In particular, the 2-pass amount of the transparent toner can be changed for each pixel in accordance with the amount of the color toners.

Third Embodiment

In the first embodiment, the amount of the transparent toner for use in 2-pass simulation employing the LUT obtained when the lightness has M levels and the amount of the transparent toner has N levels.

In a third embodiment, the amount of the transparent toner for use in 2-pass simulation is determined employing a LUT obtained in further consideration of the difference of chromaticity. This enables the difference in chromaticity, in addition to the lightness and the saturation, to be considered, so the differences in the lightness and saturation can be suppressed more precisely. In the image processing apparatus according to the present embodiment, the same reference numerals are used in similar elements to those in the first embodiment, and the detailed description is not repeated here.

First, a method for generating a 1-pass lightness characteristics LUT and 1-pass saturation characteristics LUT is described below.

In this embodiment instead of just using M patches of varying lightness, Q×M×P patches are used. The patches are created by creating patches with M different lightness values, P different values along the a axis in Lab space, and Q different values along the b axis in Lab space. A 1-pass clear patch image in which N different amounts of the transparent toner and patches having no transparent toner are applied to each of the different color patches is printed. The 1-pass clear patch image can be an output in which data stored in the ROM 402 is printed or can also be an output in which data transmitted from the PC 102 through the driver and stored in the HDD 403 is printed. Alternatively, the 1-pass clear patch image can also be an output in which data transmitted from the PC 102 through the driver is directly printed.

Then, the Lab value of each patch of a printed output of the 1-pass clear patch image is read using a calorimeter having the Lab metering function or the scanner portion 201 of the MFP 101. The lightness and saturation of each patch is derived from the obtained Lab value.

In the following description, the derived lightness is represented by L1 (L, a, b, CL) and the derived saturation is represented by S1 (L, a, b, CL) where the lightness of a source image is L, the chromaticity is "a" and "b", and the 1-pass clear amount is CL.

Using L1 (L, a, b, CL) and S1 (L, a, b, CL), the difference value dL1 (L, a, b, CL) between the lightness of an image in which the transparent toner is applied using the 1-pass process and that of an image in which no transparent toner is applied and the difference value dS1 (L, a, b, CL) between the saturation of an image in which the transparent toner is applied using the 1-pass process and that of an image in which no transparent toner is applied are calculated by the following expressions:

$$dL1(L,a,b,CL)=L1(L,a,b,CL)-L1(L,a,b,0)$$

$$dS1(L,a,b,CL)=S1(L,a,b,CL)-S1(L,a,b,0)$$

where CL=0 indicates that no transparent toner is applied. The obtained dL1 (L, a, b, CL) is an element of the 1-pass lightness characteristics LUT, and the obtained dS1 (L, a, b, CL) is an element of the 1-pass saturation characteristics LUT.

A method for generating a 2-pass lightness characteristics LUT and 2-pass saturation characteristics LUT is described below.

Again Q×M×P different color patches are used. The patches are created by creating patches with M different lightness values, P different values along the a axis in Lab space, and Q different values along the axis in Lab space. A 2-pass clear patch image in which N different amounts of the transparent toner and patches having not transparent toner are applied to each of the different color patches is printed by the single or multiple MFPs for performing 2-pass printing. The 2-pass clear patch image can be an output in which data stored in the ROM 402 is printed or can also be an output in which data transmitted from the PC 102 through the driver and stored in the HDD 403 is printed. Alternatively, the 2-pass clear patch image can also be an output in which data transmitted from the PC 102 through the driver is directly printed.

Then, the Lab value of each patch of a printed output of the 2-pass clear patch image is read using a calorimeter having the Lab metering function or the scanner portion 201 of the MFP 101. The lightness L2 (L, a, b, CL) and the saturation S2 (L, a, b, CL) of each patch are derived from the obtained Lab value.

Using L2 (L, a, b, CL) and S2 (L, a, b, CL), the difference value dL2 (L, a, b, CL) between the lightness of an image in which the transparent toner is applied using the 2-pass process and that of an image in which no transparent toner is applied in the 1-pass process and the difference value dS2 (L, a, b, CL) between the saturation of an image in which transparent toner is applied using the 2-pass process and that of an image in which no transparent toner is applied in the 1-pass process are calculated by the following expressions:

$$dL2(L,a,b,CL)=L2(L,a,b,CL)-L1(L,a,b,0)$$

$$dS2(L,a,b,CL)=S2(L,a,b,CL)-S1(L,a,b,0).$$

The obtained dL2 (L, a, b, CL) is an element of the 2-pass lightness characteristics LUT, and the obtained dS2 (L, a, b, CL) is an element of the 2-pass saturation characteristics LUT.

The MFP 101 for performing 1-pass printing runs 2-pass simulation using the characteristics LUTs generated in the above-described way.

Figure 14:
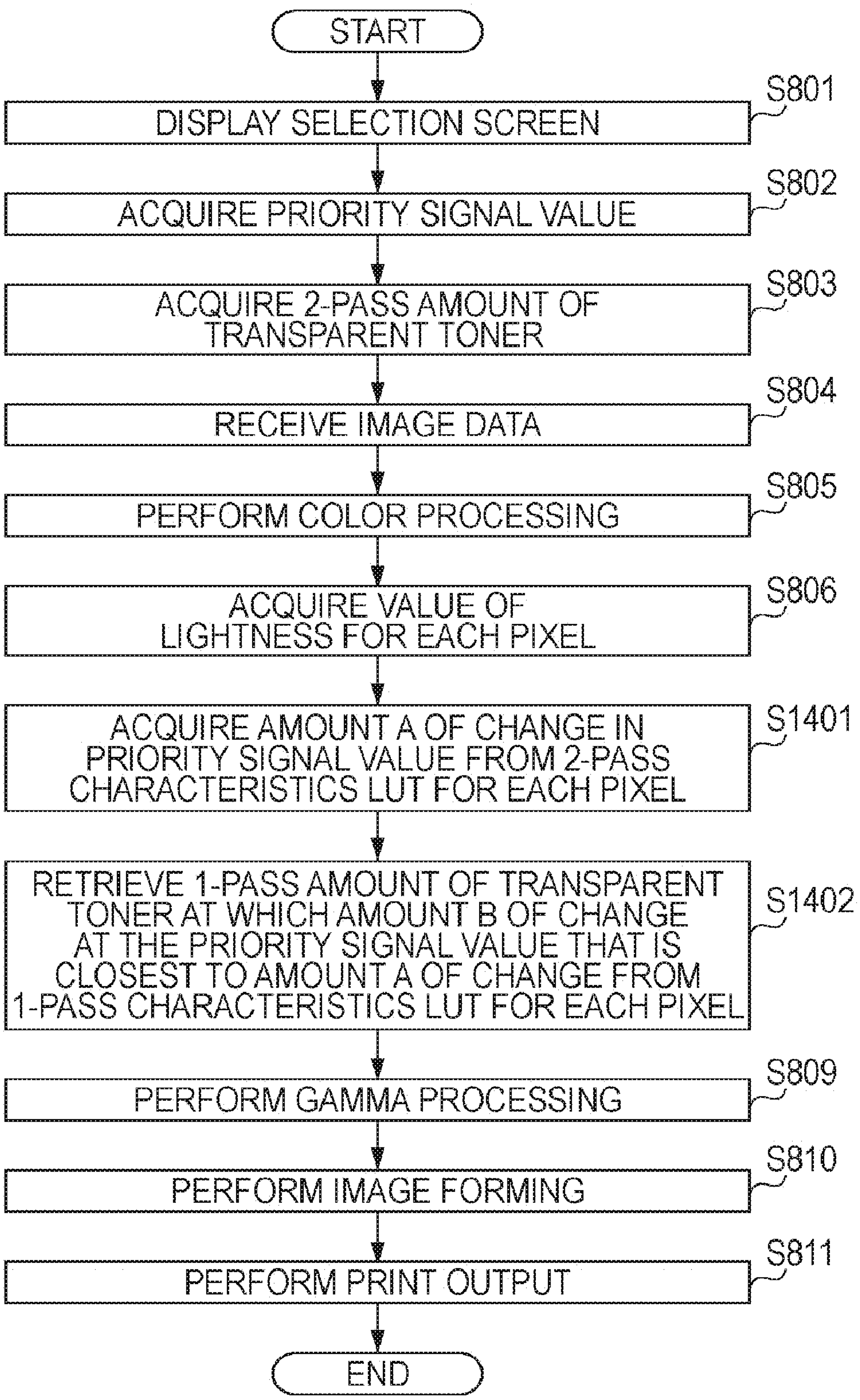
FIG. 14 is a flowchart that illustrates a process of image processing according to another embodiment of the present invention.

The steps of the flowchart illustrated in FIG. 14 described below can be implemented in the form of, for example, computer-readable program code in an application program area in the ROM 402, the HDD 403, or the RAM 405. The 2-pass simulation according to the present embodiment carried out by the MFP 101 for performing 1-pass printing is run by the CPU 401 executing the program code.

In step S1401, from the 2-pass lightness characteristics LUT 903 or 2-pass saturation characteristics LUT 904 stored in the HDD 403, with respect to the signal value, the amount of change in the signal value when the transparent toner is applied with a dot area coverage of the 2-pass amount of the transparent toner is acquired.

For example, a case is discussed where the user wishes to apply the transparent toner to a certain pixel of C, M, Y, and Bk images that has a lightness of 70, a chromaticity "a" of −40, and a chromaticity "b" of 40 using the 2-pass process with a dot area coverage of 70%. In this case, using the above values as an input, the amount of change in lightness caused by application of the transparent toner using the 2-pass printing (dL2) is determined as −20 from the 2-pass lightness characteristics LUT.

In step S1402, while the lightness L and chromaticity "a" and "b" of that pixel are fixed and the 1-pass clear amount is changed, the 1-pass lightness characteristics LUT 905 or 1-pass saturation characteristics LUT 906 stored in the HDD 403 is referred to. In such a way, N different values of the 1-pass lightness characteristics LUT are obtained.

For example, when the 1-pass lightness characteristics LUT is referred to while the lightness is fixed at 70, the chromaticity "a" is fixed at −40, and the chromaticity "b" is fixed at 40 and the 1-pass clear amount is changed, various dL1 values can be retrieved. The 1-pass clear amount at which the absolute value of the difference between dL2 and dL1 is a minimum is determined as the amount of the transparent toner for use in 2-pass simulation.

With the present embodiment, the difference between signal values resulting from the difference between a fixing condition for the transparent toner and that in the color toners can be suppressed more finely. Accordingly, the lightness and saturation of a print material in which the transparent toner is to be applied using the 2-pass process can more readily be reproduced through the 1-pass process.

Fourth Embodiment

In a fourth embodiment of the present invention, a printing method of automatically adjusting the amount of applying the transparent toner to reduce the difference in lightness and saturation between a printed output in which the transparent toner is applied using the 1-pass process and a source image (a printed output in which no transparent toner is applied) is described below. This printing method is hereinafter referred to as image-quality priority mode. In the image processing apparatus according to the present embodiment, the same reference numerals are used in similar elements as those in the first embodiment described above, and the detailed description is not repeated here.

In the present embodiment, any one of the characteristics LUTs illustrated in the first to third embodiments can be used. The description thereof is not repeated here, and a case where the LUTs illustrated in the first embodiment are used is described below.

Figure 15:
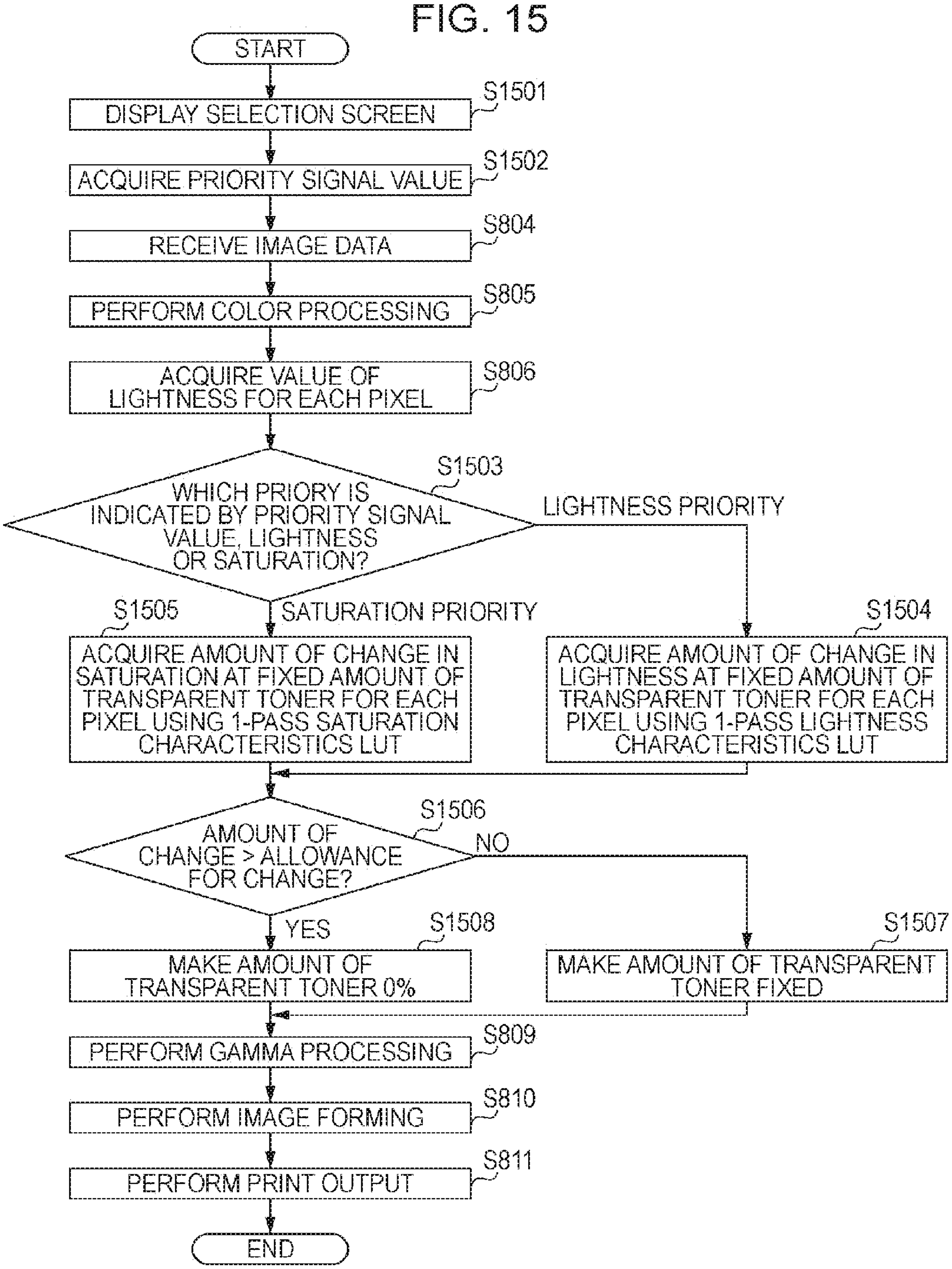
FIG. 15 is a flowchart that illustrates a process of image processing according to another embodiment of the present invention.

The steps of the flowchart illustrated in FIG. 15 described below can be implemented in the form of, for example, computer-readable program code in an application program area in the ROM 402, the HDD 403, or the RAM 405. The amount of the transparent toner for use in the image-quality priority mode carried out by the MFP 101 for performing 1-pass printing is determined by the CPU 401 executing 2-pass simulation according to the present embodiment. The details are described below using the memory map of the HDD 403 illustrated in FIG. 9 and the memory map of the RAM 405 illustrated in FIG. 10.

Figure 16:
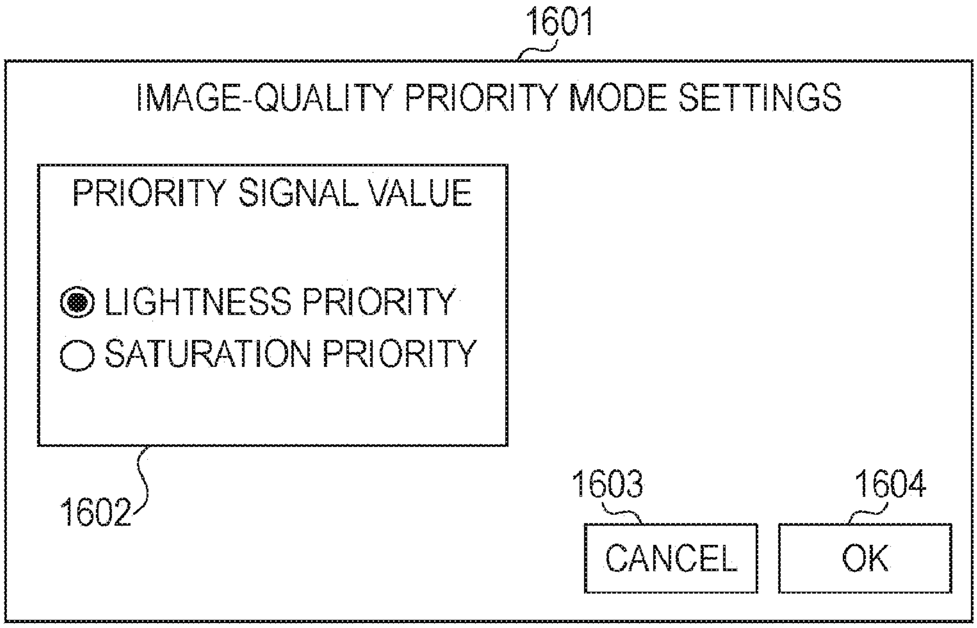
FIG. 16 illustrates an example of a screen appearing on a PC or a display device of the MFP.
Figure 17A:
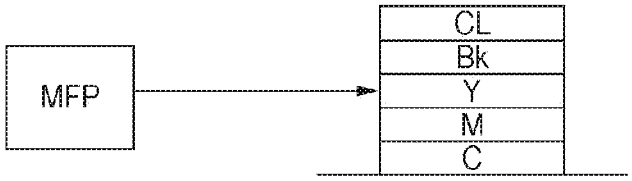
FIGS. 17A, 17B, and 17C illustrate concepts of 1-pass and 2-pass processes.
Figure 17B:
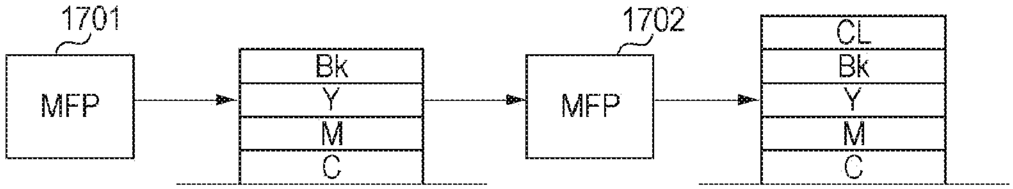
Figure 17C:
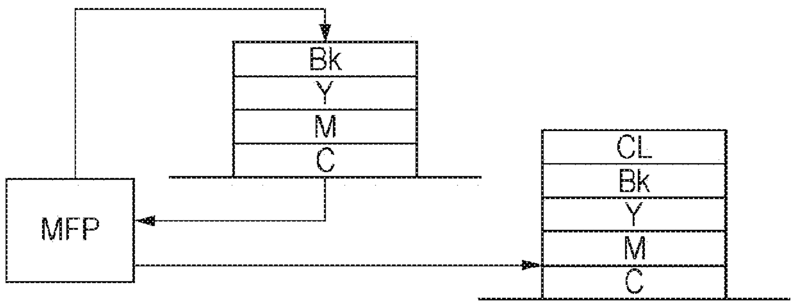

In step S1501, a selection screen is displayed on the display portion 302 using information 901 for touch panel display stored in the HDD 403. An example of the selection screen is illustrated in FIG. 16. In FIG. 16, a display screen 1601 includes a section 1602 for allowing the user to select a priority signal value. When a Cancel button 1603 is pressed, the selection is cancelled. When an OK button 1604 is pressed, the selection is confirmed. In step S1502, an instruction is input on the screen 1601.

In step S1502, the priority signal value is selected by the user using the input portion 301, and the selection is stored in the RAM 405 as information 1002 indicating the priority signal value. In the present embodiment, the lightness is selected as the priority signal value.

In step S1503, it is determined which priority is selected by the user in step S1502, lightness or saturation, from the information 1002 indicating the priority signal value stored in the RAM 405.

In step S1503, when the lightness priority is determined to be selected, flow proceeds to step S1504. In step S1504, the 1-pass lightness characteristics LUT is referred to, and the amount of change (dL1) when the transparent toner of a fixed amount 907 of the transparent toner stored in the HDD 403 is applied is acquired.

In step S1503, when the saturation priority is determined to be selected, flow proceeds to step S1505. In step S1505, the 1-pass saturation characteristics LUT is referred to, and the amount of change (dS1) when the transparent toner of the fixed amount 907 of the transparent toner (third amount of the transparent toner) stored in the HDD 403 is applied is acquired.

In step S1506, the absolute value of the amount of change (in lightness or saturation) is compared with a predetermined threshold (allowance for change in lightness 908 or allowance for change in saturation 909) stored in the HDD 403.

When the amount of change is equal to or smaller than the predetermined threshold (NO in step S1506), flow proceeds to step S1507. In step S1507, the fixed amount of the transparent toner is determined as the amount of the transparent toner for that pixel. When the amount of change is larger than the predetermined threshold (YES in step S1506), flow proceeds to step S1508, where the amount of the transparent toner is determined as 0%. Here in step S1508, the amount of the transparent toner can be substantially 0%.

For example, a case is discussed where the user wishes to apply the transparent toner to a pixel of C, M, Y, and Bk images that has a lightness of 70 with a minimum quantity of 10% to prioritize image quality. When it is assumed that the amount of change in lightness caused by application of the transparent toner using the 1-pass process (dL1) is obtained as −10 from the 1-pass lightness characteristics LUT, if the allowance for change in lightness is set as −9, the amount of the transparent toner for this pixel is 0%.

The fixed amount of the transparent toner, the allowance for change in lightness, and the allowance for change in saturation may be specified by the user, or may also be specified as a matter of design.

The processing described above may be implemented as a matrix operation from C, M, Y, and Bk to C, M, Y, Bk, and CL. Also in this case, similar to the present embodiment, the user can readily obtain a printed output to which the transparent toner is applied using the 1-pass process, the printed output having a reduced difference in lightness and saturation from C, M, Y, and Bk images under the transparent toner, merely by selecting several parameters from a user interface.

Other Embodiments

The transparent toner used in the above embodiments is not limited to a colorless transparent toner. For example, a colored (e.g., reddish or bluish) translucent toner may also be used.

The present invention is also applicable to a system including a plurality of apparatuses (e.g., a host computer, an interface device, a reader, a printer) or also applicable to an apparatus including a single device (e.g., a copier, a facsimile machine).

Supplying a storage medium that stores program code (computer program) of software achieving the functions of at least one of the above-described embodiments to a system or an apparatus, and reading the computer program from the system or the apparatus, and executing it can also accomplish the present invention.

In this case, the functions of at least one of the above-described embodiments are achieved by the program code in itself read from the computer-readable storage medium. The storage medium storing the computer program is included in the present invention.

Examples of the storage medium for supplying the computer program include a flexible disk, a hard disk, an optical disk, a magneto-optical disk, a compact-disk read-only memory (CD-ROM), a CD-recordable (CD-R), tape, a non-volatile memory card, and a ROM.

The functions of at least one of the above-described embodiments can be achieved not only by execution of a computer program read by a computer but also by performance of a part or entirety of actual processing by an operating system (OS) running on the computer in response to instructions of the computer program.

The functions of at least one of the above-described embodiments can also be achieved by writing of a computer program read from a storage medium into a memory incorporated in a function expansion board inserted into a computer or a function expansion unit connected to the computer and then performance of a part or entirety of actual processing by a CPU included in the function expansion board or the function expansion unit in response to instructions of the computer program.

While the present invention has been described with reference to exemplary embodiments, it is to be understood that the invention is not limited to the disclosed exemplary embodiments. The scope of the following claims is to be accorded the broadest interpretation so as to encompass all modifications and equivalent structures and functions.

This application claims the benefit of Japanese Patent Application No. 2008-145717 filed Jun. 3, 2008, which is hereby incorporated by reference herein in its entirety.

What is claimed is:

1. An image processing apparatus comprising:

a change-amount acquiring unit configured to acquire an amount of change in lightness between an image after a color toner is fixed to a recording medium and an image after the color toner and a third amount of a transparent toner are fixed to the recording medium, the third amount of the transparent toner amount being previously used and stored;

a determining unit configured to determine whether the amount of change in lightness acquired by the change-amount acquiring unit is equal to or larger than a predetermined threshold; and a setting unit configured to set an amount of the transparent toner to be fixed to the recording medium at zero when the determining unit determines that the amount of change in lightness is equal to or larger than the predetermined threshold and to set the amount of the transparent toner to be fixed to the recording medium at the third amount of the transparent toner when the determining unit determines that the amount of change in lightness is smaller than the predetermined threshold.

2. A method for controlling an image processing apparatus, the method comprising:

a change-amount acquiring step of acquiring an amount of change in lightness between an image after a color toner is fixed to a recording medium and an image after the color toner and a third amount of a transparent toner are fixed to the recording medium, the third amount of the transparent toner being previously used and stored;

a determining step of determining whether the amount of change in lightness acquired in the change-amount acquiring step is equal to or larger than a predetermined threshold; and a setting step of setting an amount of the transparent toner to be fixed to the recording medium at zero when it is determined in the determining step that the amount of change in lightness is equal to or larger than the predetermined threshold and setting the amount of the transparent toner to be fixed to the recording medium at the third amount of the transparent toner when it is determined in the determining step that the amount of change in lightness is smaller than the predetermined threshold.

3. A non-transitory computer-readable storage medium that stores a program for causing a computer to execute the method according to claim 2.

* * * * *